United States Patent [19]
Hunter

[11] Patent Number: 6,037,033
[45] Date of Patent: Mar. 14, 2000

[54] INSULATION PANEL

[76] Inventor: Rick Cole Hunter, 108 Imperial, Friendswood, Tex. 77546

[21] Appl. No.: 08/888,888

[22] Filed: Jul. 7, 1997

Related U.S. Application Data

[63] Continuation-in-part of application No. 08/730,942, Oct. 16, 1996, which is a continuation-in-part of application No. 08/682,933, Jul. 8, 1996, Pat. No. 5,792,539.

[51] Int. Cl.[7] ........................................................ B32B 3/00
[52] U.S. Cl. ................................. 428/72; 428/74; 428/76; 428/178; 428/184; 52/783.11; 52/794.1
[58] Field of Search ..................................... 428/182, 184, 428/72, 74, 76, 178, 179, 192; 52/783.11, 794.1

[56] References Cited

U.S. PATENT DOCUMENTS

| | | | |
|---|---|---|---|
| 822,848 | 6/1906 | Kunz | 428/182 |
| 2,045,733 | 6/1936 | Spafford . | |
| 2,314,876 | 3/1943 | Greene | 428/155 |
| 2,342,839 | 2/1944 | Byers | 428/182 |
| 3,086,899 | 4/1963 | Smith et al. | 428/178 |
| 3,525,661 | 8/1970 | Jackson | 428/182 |
| 4,055,268 | 10/1977 | Barther | 220/9 C |
| 4,204,016 | 5/1980 | Chavannes | 428/108 |
| 4,513,041 | 4/1985 | Delluc | 428/69 |
| 4,579,756 | 4/1986 | Edgel | 428/34 |
| 4,783,356 | 11/1988 | Kugelmann | 428/60 |
| 4,791,773 | 12/1988 | Taylor | 52/790 |
| 4,837,388 | 6/1989 | Kugelmann | 428/69 |
| 5,018,328 | 5/1991 | Cur et al. | 220/420 |
| 5,032,439 | 7/1991 | Gucksman et al. | 428/44 |
| 5,082,335 | 1/1992 | Cue et al. | 312/401 |
| 5,084,899 | 1/1992 | Rusek | 428/533 |
| 5,090,981 | 2/1992 | Rusek, Jr. | 65/4.4 |
| 5,107,649 | 4/1992 | Benson et al. | 52/309.4 |
| 5,157,893 | 10/1992 | Benson et al. | 52/792 |
| 5,252,408 | 10/1993 | Bridges et al. | 428/621 |
| 5,271,980 | 12/1993 | Bell | 428/68 |
| 5,330,816 | 7/1994 | Rusek | 428/69 |
| 5,376,424 | 12/1994 | Watanabe | 428/69 |
| 5,398,510 | 3/1995 | Gilley et al. | 62/3.6 |
| 5,399,408 | 3/1995 | Nowara | 428/73 |
| 5,445,857 | 8/1995 | Nawobilski | 428/69 |
| 5,505,046 | 4/1996 | Nelson et al. | 62/3.6 |
| 5,522,216 | 6/1996 | Bark et al. | 62/3.6 |

*Primary Examiner*—Donald Loney
*Attorney, Agent, or Firm*—Kurt S. Myers

[57] ABSTRACT

The present invention is directed to a unique thermal insulation panel. More specifically, the present invention is directed to a vacuum insulated panel formed of a highly impermeable evacuated envelope that is supported by a thermal barrier made of a macro-structural support structure having a cell or void size of 0.5 micron or greater. Preferably, the panel includes a getter material. Further, the present invention is directed to a thermal insulation barrier of a macro-structural structure. Preferably, the barrier is formed of elements having a geometric shape of a repetitive three dimensional design that permits stacking of one thermal insulation element with another thermal insulation element having a complimentary geometric shape, and which locks movement of adjacent thermal insulation elements in at least one of the directions 90° to the stacking direction.

25 Claims, 14 Drawing Sheets

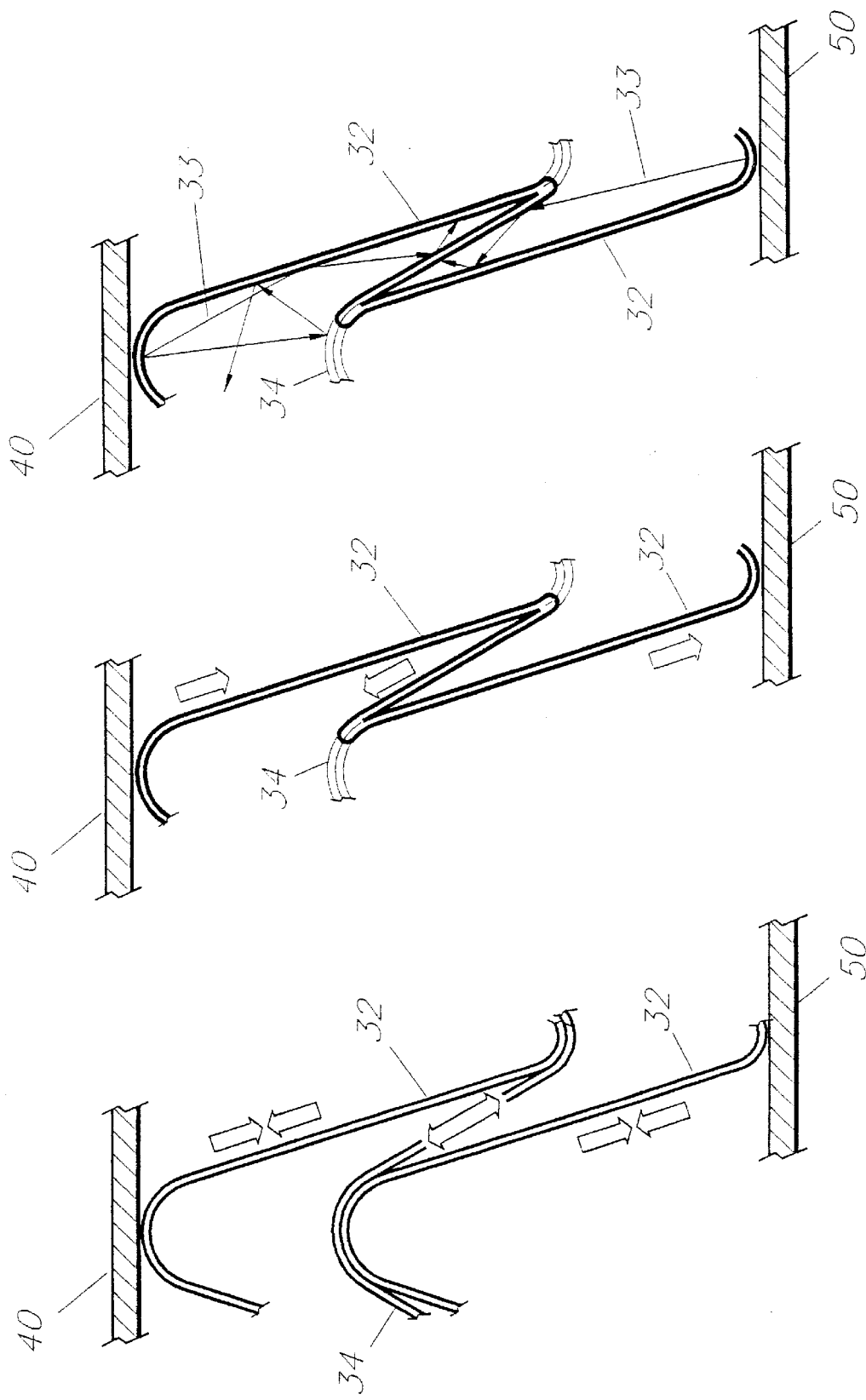

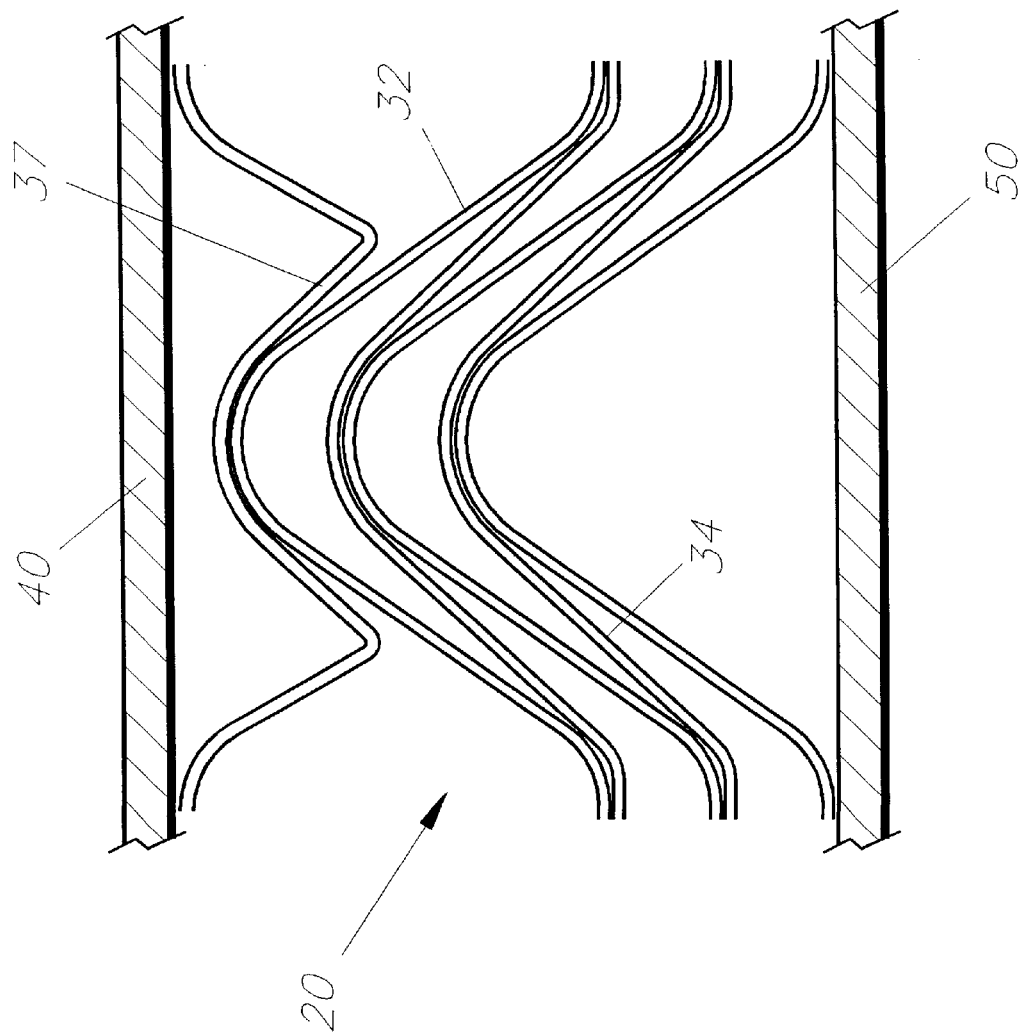

INSULATION PANEL

RELATED APPLICATION

This application is a continuation-in-part application of U.S. patent application Ser. No. 08/730,942 pending, filed Oct. 16, 1996 entitled "INSULATION PANEL" which in turn is a continuation-in part application of U.S. patent application Ser. No. 08/682,933, filed Jul. 8, 1996 now U.S. Pat. No. 5,792,539, entitled "INSULATION BARRIER".

FIELD OF THE INVENTION

The present invention is directed to a unique thermal insulation panel. More specifically, the present invention is directed to a vacuum insulated panel formed of a highly impermeable evacuated envelope that is supported by a thermal barrier made of a macro-structural support structure having a cell or void size of 0.5 micron or greater. Preferably, the panel includes a getter material. Further, the present invention is directed to a thermal insulation barrier of a macro-structural structure. Preferably, the barrier is formed of elements having a geometric shape of a repetitive three dimensional design that permits stacking of one thermal insulation element with another thermal insulation element having a complimentary geometric shape, and which locks movement of adjacent thermal insulation elements in at least one of the directions 90° to the stacking direction.

BACKGROUND OF THE INVENTION

U.S. Pat. No. 4,055,268 discloses a double walled cryogenic storage container with a vacuum space containing multi-layer insulation comprising thin radiation layers separated by permanently pre-compressed fiber sheets.

U.S. Pat. No. 4,513,041 discloses insulating panels in which evacuated cells are inserted. Each vacuum cell is composed of a rigid plastic tube, both ends of which are closed by perforated plugs, and the tube placed in a thin flexible sheath of highly impervious plastic material. This sheath extends beyond both ends of the rigid tube and is sealed by welding after the rigid tube has been evacuated to a high vacuum.

U.S. Pat. No. 4,579,756 discloses an insulating sheet material made of a plurality of air tight chambers, each having a partial vacuum therein, held together in closely spaced side-by-side relationship so as to form a sheet of such compartments.

U.S. Pat. Nos. 4,783,356 and 4,837,388 disclose an article of insulation which has outer sheet-like elements of elastic material secured by adhesive to a rigid deformable material as an inner element and deforming in a particular pattern, following which the inner element retains its deformed shape while the outer elements spring back to their original shape, leaving voids in which there is a partial vacuum.

U.S. Pat. No. 4,791,773 discloses a pair of panel sheets which form a sandwich with an undulated ribbon-like spacer in the interior thereof and marginal spacers about the periphery of the sheets. A vacuum within the space between the marginal spacers insulates and rigidifies the assembly.

U.S. Pat. No. 5,018,328 discloses a vacuum insulation panel having flexible gas impermeable walls formed in multiple substantially adjacent compartments. Multiple compartments are utilized to enhance the long term thermal characteristics of the panel by "protecting" the vacuum characteristics of at least one of the compartments by surrounding it with additional evacuated compartments. This results in a very minimal gas pressure gradient across the internal walls forming the internal compartment to minimize gas and vapor permeation into it, thus greatly enhancing the lifetime of the panel. Further, this permits strategic placing of gettering materials such that gettering materials absorbing certain gases can be placed in the outer compartments and other gettering materials absorbing different gases can be placed in the internal compartments to enhance the lifetime of the panel.

U.S. Pat. No. 5,032,439 discloses thermal insulation vacuum panels formed of an inner core of compressed low thermal conductivity powders enclosed by a ceramic/glass envelope evacuated to a low pressure.

U.S. Pat. No. 5,082,335 discloses a refrigeration appliance having a vacuum insulation system wherein a combination of vacuum thermal insulation panels and polyurethane foam provide the thermal insulating properties as well as structural support.

U.S. Pat. No. 5,090,981 discloses a method for making high R superinsulation panels; U.S. Pat. No. 5,094,899 discloses an insulation panel which comprises a mineral fiber board, the fibers having no organic binder thereon, and particulate material packed in the interstices of the board and a gas tight envelope encapsulating the board, the envelope being evacuated; and U.S. Pat. No. 5,330,816 discloses a superinsulation panel.

U.S. Pat. Nos. 5,107,649 and 5,157,893 disclose an ultrathin compact vacuum insulation panel comprised of two hard but bendable metal wall sheets closely spaced apart from each other and welded around the edges to enclose a vacuum chamber. Glass or ceramic spacers hold the wall sheets apart.

U.S. Pat. No. 5,252,408 discloses a vacuum insulated panel formed of peripherally welded metallic wall members which define a cavity within which a solid compressed block of a particulate material is disposed. The particulate material, preferably an activated carbon black, a silica gel or a combination thereof, serves as a barrier to radiant thermal transmission through the panel, acts as a getter to maintain the vacuum in the cavity, and, with proper density, supports the walls of the panel against collapse when the cavity is evacuated.

U.S. Pat. No. 5,271,980 discloses a flexible insulating panel which comprises a first flexible external sheet opposing a second flexible external sheet, each sheet comprises a plurality of corrugated gas impermeable layers joined with a gas tight seal to form an internal space that is evacuated of air. Spacers press against a membrane to resist the facewise compressive forces. The evacuated insulating panel is flexible, both in use and application.

U.S. Pat. No. 5,376,424 discloses a thermal insulating material which is packed in a sealing bag composed of an obverse face material and a reverse face material, each made of a metal foil, and which is sandwiched by a sealant layer of plastic film adhesively affixed to one side thereof and by a surface layer of plastic film adhesively affixed to the other side thereof.

U.S. Pat. No. 5,398,510 discloses a superinsulation panel and a thermoelectric assembly which maintains the temperature within a refrigerator or other type of enclosed structure at a desired value.

U.S. Pat. No. 5,399,408 discloses a thermal insulating body for thermal insulation, consisting of a shell which can be evacuated and which is filled with a solid, microporous thermal insulating material.

U.S. Pat. No. 5,445,857 discloses vacuum insulating panels which are provided with textured surfaces that localize thermal expansion.

U.S. Pat. No. 5,505,046 discloses apparatus including a power supply and control system to provide for maintaining the temperature within an enclosed structure using thermoelectric devices.

U.S. Pat. No. 5,522,216 discloses a refrigerator which combines the benefits of superinsulation materials with thermoelectric devices and phase change materials to provide an environmentally benign system that is energy efficient and can maintain relatively uniform temperatures for extended periods of time with relatively low electrical power requirements.

SUMMARY OF THE INVENTION

The present invention is directed to an insulation panel having an envelope, preferably made of at least two pieces, an upper portion and a lower portion, of a high gas barrier material which surrounds a thermal insulation barrier that supports the envelope. The envelope has sealed edges and is evacuated to produce the panel. Further, the present invention is directed to a thermal insulation barrier formed of elements having a geometric shape of a repetitive three dimensional design that permits stacking of one thermal insulation element with another thermal insulation element having a complimentary geometric shape and locks movement of adjacent thermal insulation elements in at least one of the directions 90° to the stacking direction. This repetitive three dimensional design which permits stacking of one thermal insulation element with another thermal insulation element creates a macro-structural structure having a void space of 0.5 microns or greater.

BRIEF DESCRIPTION OF THE DRAWINGS

FIG. 7 is a schematic view of one design of the thermal insulation barrier of the present invention showing three thermal insulation elements, the outside elements are in compression the alternate element is in tension;

FIG. 8 is a schematic view of the thermal insulation barrier of FIG. 7 showing the thermal conduction path across the barrier;

FIG. 9 is a schematic view of the thermal insulation barrier of FIG. 7 showing a representative radiant heat emittance path across the barrier;

FIG. 10 is a cross-sectional view of one design of a multi-layer thermal insulation barrier of the present invention with multiple layers of thermal insulation elements;

DESCRIPTION OF THE PREFERRED EMBODIMENTS

Figure 1:
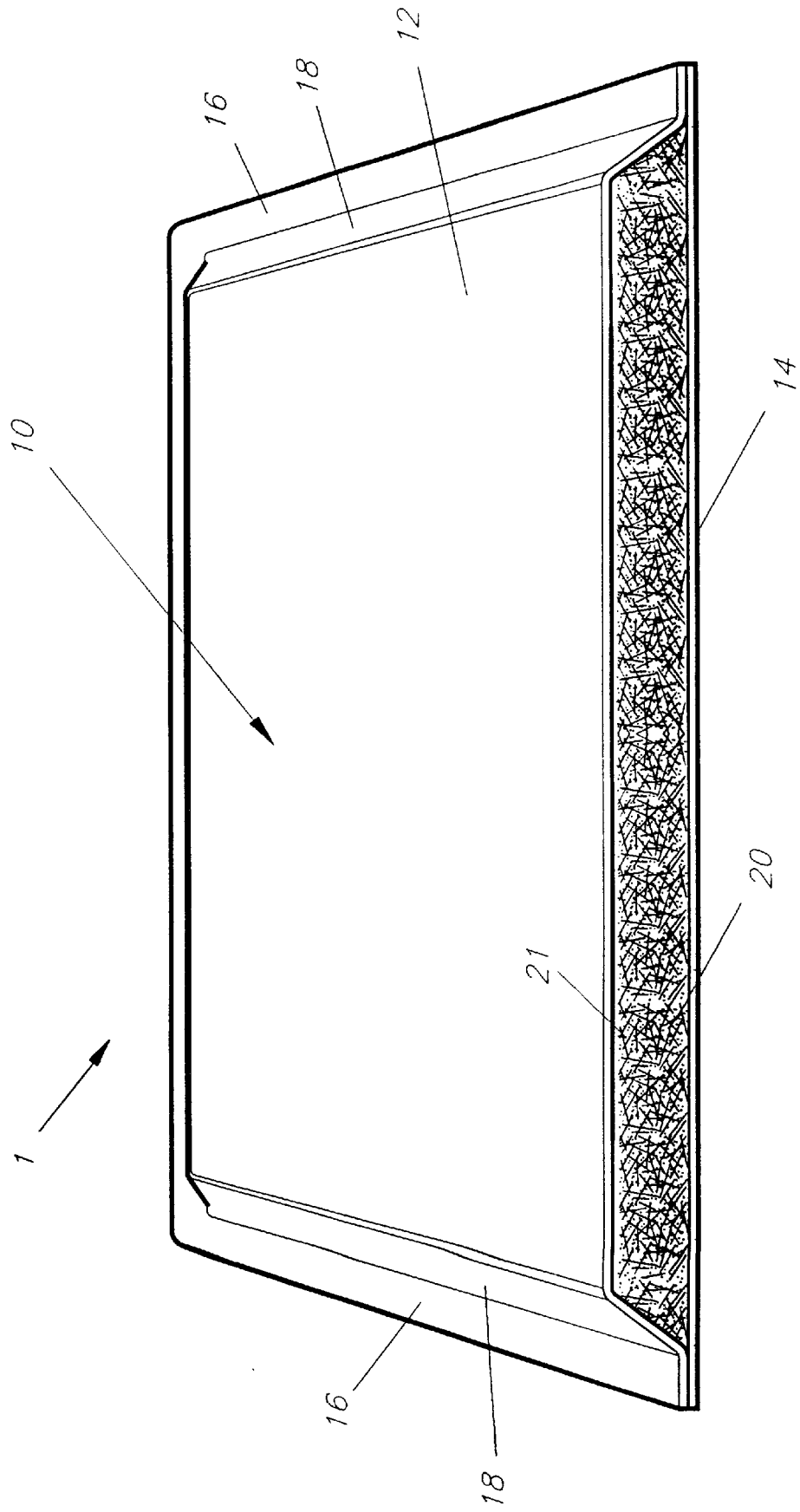
FIG. 1 is an isometric cross-sectional view of a panel of one embodiment of the present invention with a barrier of fibers or fibers and powder.
Figure 3:
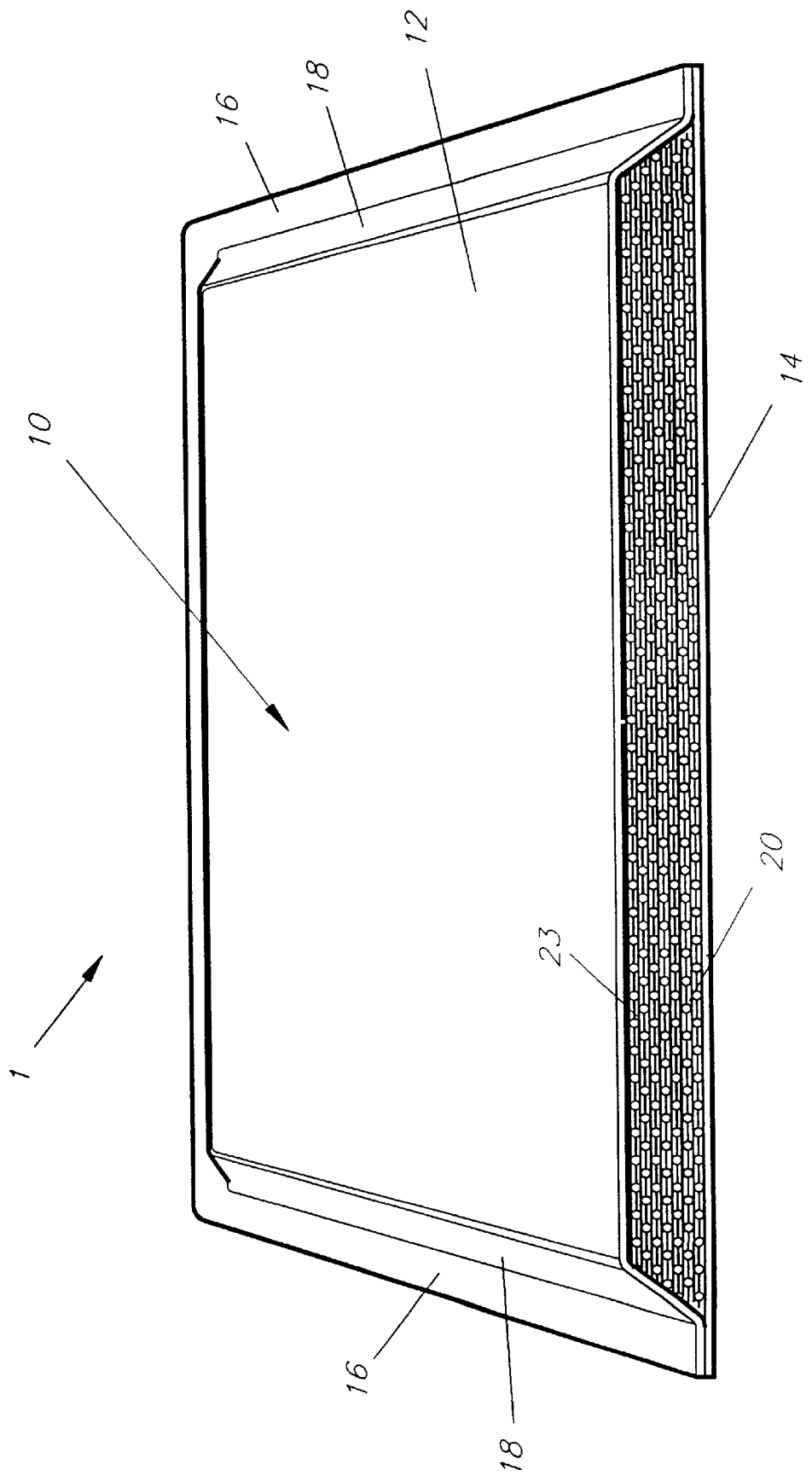
FIG. 3 is an isometric cross-sectional view of a panel of another embodiment of the present invention with a barrier of glass or plastic spheres.

The present invention is best understood when the patentable features of the present invention are compared to the prior art. The high R super insulation panels described in U.S. Pat. No. 5,094,899 are considered state of the art insulation panels; however, these panels suffer one significant deficiency. The significant deficiency is that the panels suffer high edge losses, meaning that while the panel has an R value in the middle of the panel that is very high the R value at the edges is very low. The panels 10, as shown in FIG. 1 of the patent, have a metal foil envelope 14. When the panels 10 are placed in a box configuration as shown in FIG. 3, then two metal to metal surfaces are at the edges or corners, meaning that there are two highly thermal conductive surfaces having a short distance from the hot to cold compartments. The thermal losses at the edge or corner are a problem that significantly reduces the overall R rating of the panel from the R rating measured only at the center of the panel. In contrast, the panels of the present invention employ skins or outer layer materials for the panel that are a high gas barrier material and have significantly lower thermal insulation edge losses.

Another deficiency of the prior art is the use of panels with what is referred to herein as a micro-structural support barrier. Such a support barrier is illustrated in U.S. Pat. No. 5,032,439. Materials that have been used for micro-structural support systems include micro-cellular powders such as aerogels, and micro-cellular open-celled polystyrene or polyurethane foams. Typical minimum and maximum cell sizes of these materials are presented graphically in Table 1. These barriers are designed to minimize the gas conduction component of heat transfer by minimizing the cell (void or pore) size within the insulation material. While the minimization of the gas conduction component appears desirable, the problem associated with a micro-structural support in a thermal insulation panel is that the thermal conduction through the solid becomes a limitation to the overall thermal resistance. Furthermore, there is no efficient way to minimize the radiant component of heat transfer through a micro-structural support barrier of an insulation panel.

In contrast, another feature of the present invention is the use of a macro-structural support system; used herein to mean a barrier that includes a structural support system having a cell (void or pore) size of 0.5 microns or larger. A macro-structural support system can be designed to extend the length of the solid conduction heat leak paths well beyond what is possible with a micro-structural support system and can incorporate more continuous radiation barriers to efficiently minimize radiant heat transfer.

The definition of cell size for all purposes herein is:

The calculated average distance of an infinite number of lines measured through a point near the center of a representative void within a barrier to the solid surfaces of the structure.

Referring now to FIG. 1, a panel 1 of the present invention has an envelope 10, preferably made of an upper outer skin 12 and lower outer skin 14, surrounding a thermal insulation barrier 20. In making a panel 1, the outer skins 12 and 14 extend beyond the thermal insulation barrier 20, forming the envelope 10 around the thermal insulation barrier 20, and provide sealing edges 16. The thermal insulation barrier 20 supports and maintains the envelope 10 of outer skins 12 and 14 from collapsing on each other when the panel 1 is evacuated. Each panel 1 has a definite size and an outer sealing edge 16 that may have various configurations. The panel as shown in FIG. 1 shows a sealing edge 16 which is the bringing together of an upper outer skin 12 and a flat lower skin 14. The sealing edges 16 are sealed using an adhesive, by thermal welding or by metallic plating and soldering.

The skins of the present invention are preferably a high gas barrier material characterized by an Oxygen Transmission Rate (OTR) of less than $5 \times 10^{-4}$ cc (STP)/100 in$^2$/day [cubic centimeters @ standard temperature and pressure per 100 square inches per day] and a thermal conductivity product of less than $5 \times 10^{-4}$ Wm/mK. The thermal conductivity product is the effective thermal conductivity of the skin or high gas barrier material, measured in W/mK (watts per meter degree Kelvin), multiplied by the thickness of the skin measured in meters. The effective thermal conductivity takes into account the thermal conductivity of the constituent layers of the skin or high gas barrier material such as the polymers, metal coated polymers, metal foils or ceramic coated polymers.

The outer skin 14 and 16 of the panel 1 may be a laminant selected from the group consisting of multi-layers of metal coated polymers, multi-layers of non-metallic coated polymers and multi-layers of high gas barrier polymers. Metal coated or non-metal coated polymers are polymer films having a metal coating, e.g. aluminum, or a ceramic coating, e.g. SiOx. A laminant suitable as a skin for the panel of the present invention is preferably composed of two or more layers of a high gas barrier material. Each layer in the laminant has a specific function. In the simplest implementation, a laminated skin consists of two materials. One material provides the gas barrier properties to the laminant skin and the other material provides a heat sealable material for adhering the laminant skin to itself, for example to make an envelope or bag, or to another material. A typical combination of layers having moderate barrier properties would be a 0.00048 inch thick metallized polyester film laminated, using an intermediate adhesive, to a 0.002 inch thick polyethylene film. In this construction, the thin metallized polyester provides the gas barrier properties of the skin. The polyethylene layer adds structural strength to the laminant and provides the heat sealable layer necessary for heat sealing the edges of the envelope.

Typical polymer films that are metallized include oriented polypropylene, polyester, and nylon due to their strength, puncture resistance, temperature range, cost, and low permeability. Other high gas barrier materials are these same polymers coated with a non-metal coating such as a ceramic or SiOx coating, and generally have better barrier properties than metallized or aluminized films, depending in part on the thickness of each material.

Some polymers have inherently low gas permeability properties and may not be coated at all for use in the laminant structure. However, to be suitable as skins for the panels of the present invention, multiple layers of the polymers are required. Suitable materials include fluorinated-chlorinated thermoplastics (e.g. ACLAR, a product of Allied Signal Plastics), polyvinylidene chloride polymers (e.g. Saran, a product of DuPont), polyvinyl fluoride polymers (e.g. Tedlar, a product of DuPont) and ethylenevinyl alcohol (abbreviated EVAL or EVOH).

The outer skin 14 and 16 of the panel 1 may be a liquid crystal polymer. These new thermoplastics are aromatic copolyester thermoplastic polymers that exhibit a highly ordered structure in both the melt and solid states. Known liquid crystal polymers are described in U.S. Pat. No. 4,161,470, incorporated herein by reference. These polymers are the Vectra A and C resins, a wholly aromatic polyester based on poly (benzoate-naphthoate) or the Vectra B resin, a wholly aromatic copolyester-amide based on polynaphthoate-aminophenotere-phthalate, all of Hoechst Celanese; the Zenite resins, described only as based on aromatic polyesters, of DuPont Chemical Company; and the Xydar resins, a terpolymer of terephthalic acid, p-hydroxybenzoic acid and p,p'-bisphenol linked by ester bonds, of Amoco Chemical Company. These polymers exhibit both low thermal conductivity and low permeability (which means they are high gas barrier materials), making them desirable and suitable for the outer skin of a panel 1. The use of thermoplastic materials as skins 12 and 14 are preferable because of their low thermal conductivity which materially reduces the edge 18 heat loss effect of the panel 1 especially as compared to panels with metal skins. A thermoplastic panel may have edge losses several orders of magnitude less than a metal skinned panel. The effect this edge effect has on the entire panel, or enclosure, depends on the overall size of the panel. Smaller panels and enclosures can pay a high penalty for this edge loss and greatly diminish the high R value which may exist in the center of the panel.

One aspect of the present invention therefore is the ability to form skins for making the envelope of a thermal insulation panel. As illustrated in FIG. 1, an insulation barrier 20 made of fibers and particles 21 is surrounded by an envelope 10 made of a formed liquid crystal polymer, or a flexible multi-layered laminant high barrier skin. The envelope 10 is shown to have a formed upper skin 12 and a flat lower skin 14; however, the skins 12 and 14 may have any configuration of size and shape. The advantage of the panel 1 of the present invention over the panel shown in U.S. Pat. No. 5,094,890 is that the panel of the present invention has substantially less edge losses. The panels 1 of the present invention have edge losses at least 5 times less than the double metal foil edges of the patent.

While not shown in FIG. 1, the panel may have a getter material in the panel. A getter material is a material to absorb the gasses that remain in the interstices of the barrier 20 even after being evacuated or the gasses which permeate the skins of the panel. These getter materials are solids which work by physical adsorption, chemical adsorption or absorption to trap or "get" the gases in the evacuated space. Typical thermally conductive gases which remain in or permeate the envelope over time include water vapor, hydrogen, nitrogen, oxygen, carbon monoxide or dioxide and other gases found in the atmosphere or released during the fabrication process. Typical getter materials are alloys of zirconium and iron (e.g. St 707, a trademark of SAES Getters/U.S.A., Inc.) designed to sorb hydrogen, oxygen, water, carbon dioxide and nitrogen. Preferred getter materials for a insulation panel of the present invention are the COMBO SUPERGETTERS or SUPPERGETTER, products of SAES Getters/U.S.A., Inc. which is a barium lithium alloy alone or combined with barium oxide and either palladium or cobalt oxide. The getter materials may be in the form of solids in a singular location in the panel 1 or in multiple locations. Another approach is to incorporate the getter material within a polymer layer.

Figure 2:
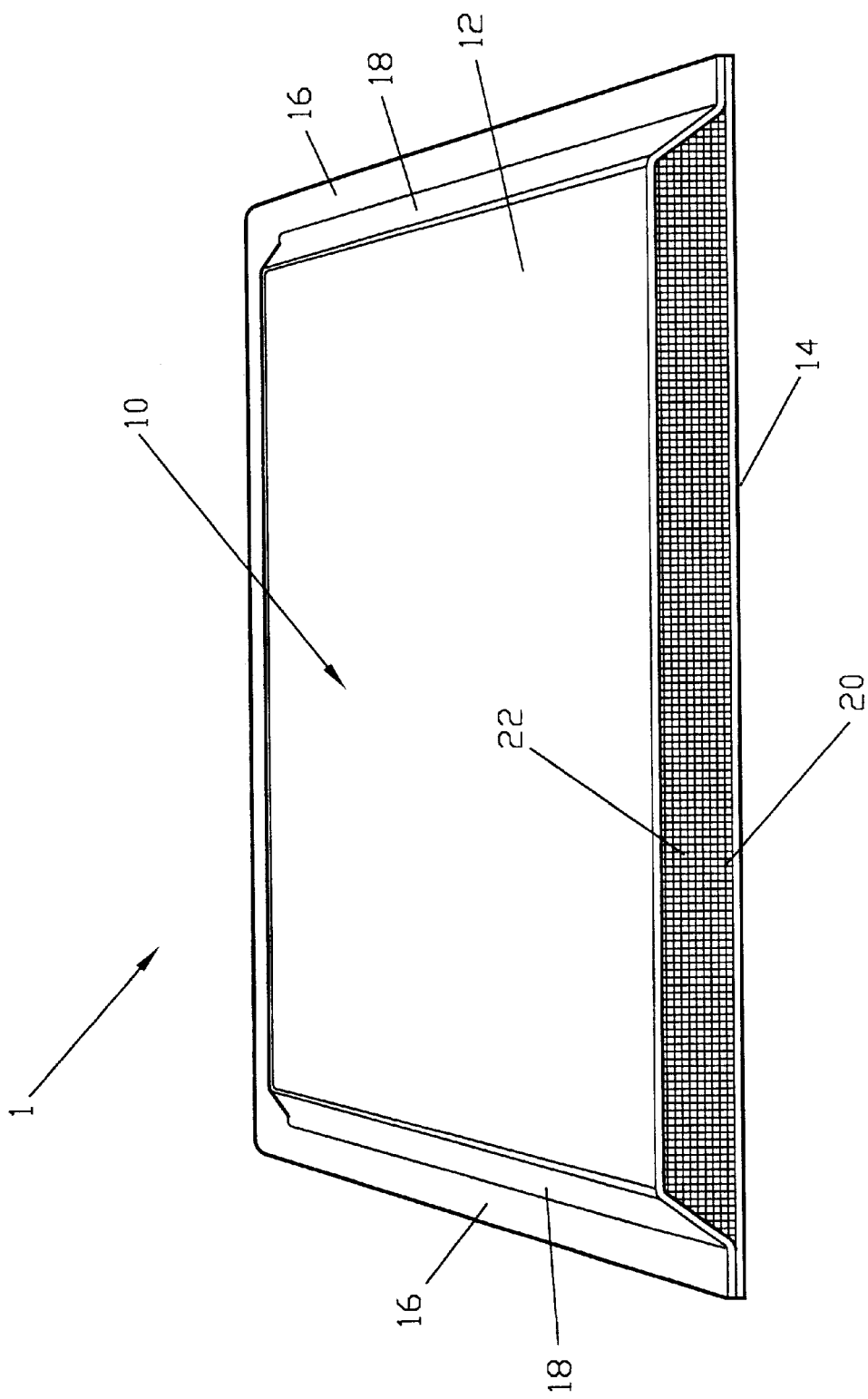
FIG. 2 is an isometric cross-sectional view of a panel of another embodiment of the present invention with a barrier of powder.
Figure 4:
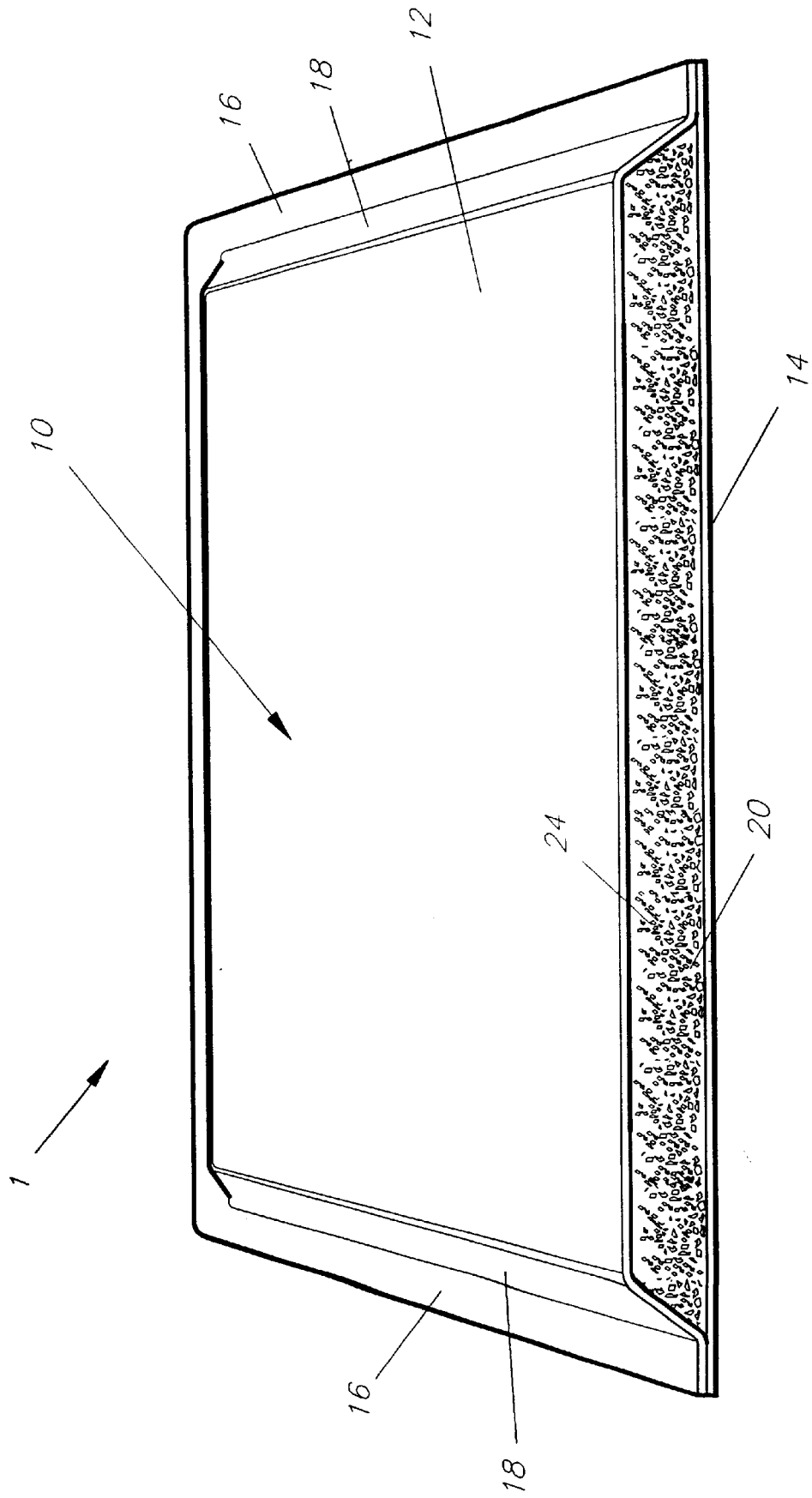
FIG. 4 is an isometric cross-sectional view of a panel of another embodiment of the present invention with a barrier of open cellular material.

A skin of a laminant or a liquid crystal polymer, used as at least one of the skins of an envelope 10, is employed with a macro-structural barrier 20 made of fibers and particles 21 to form a vacuum panel 1 as illustrated in FIG. 1. A macro-structural barrier of powders 22 is illustrated in FIG. 2. Panel 1 has a barrier 20 made of a macrostructural support system of glass or plastic balls or spheres 23 as illustrated in FIG. 3; or a barrier 20 made of a open-cell material 24 such as cork, a foamed thermoplastic or composite material as illustrated in FIG. 4. The high gas barrier envelope 10 made of a liquid crystal polymer, or a multi-layered flexible laminant, together with a getter material provides a long life to the vacuum in the panel 1, thus providing a high efficiency, vacuum thermal insulation panel over years of time.

Figure 5:
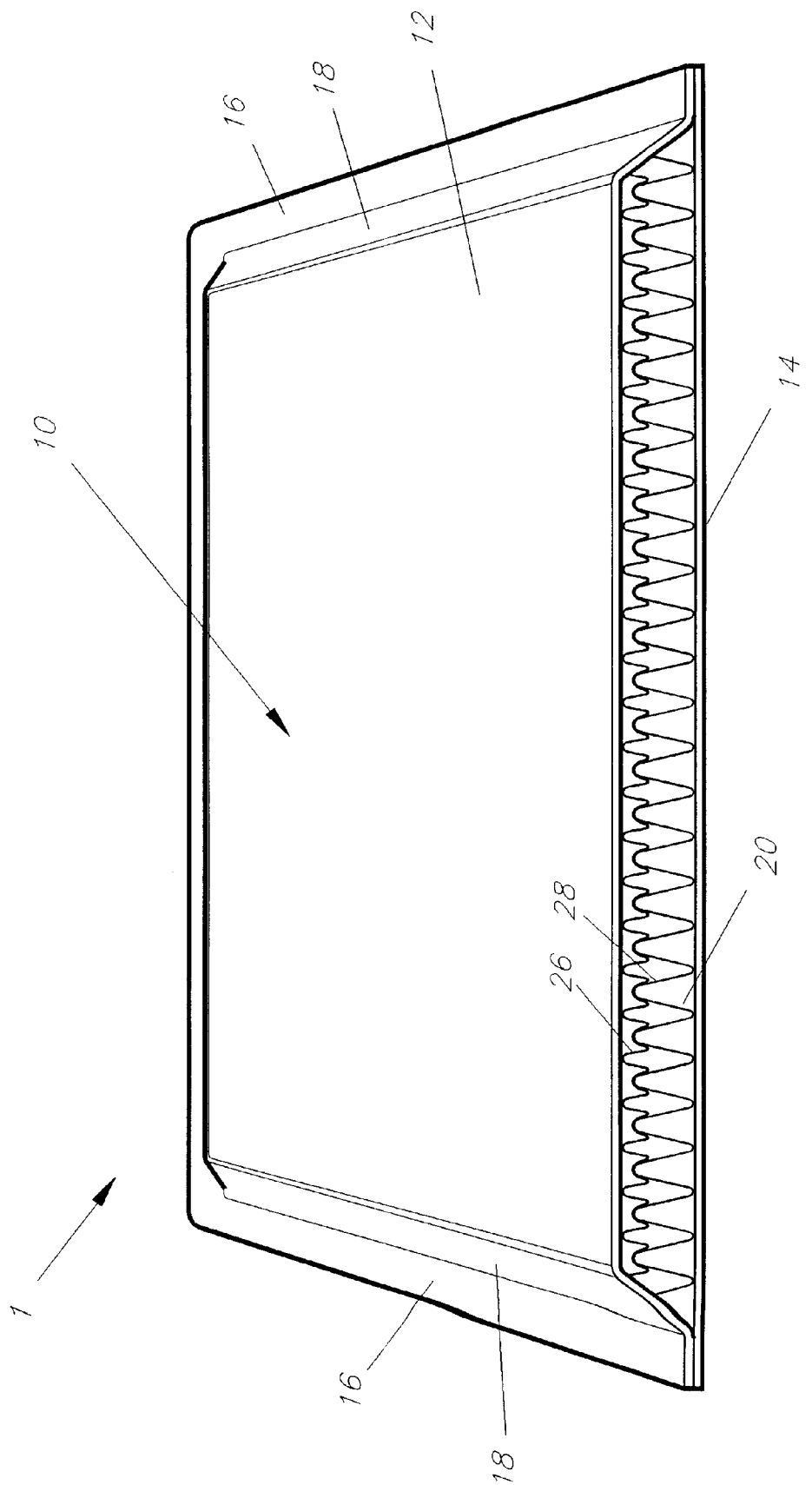
FIG. 5 is an isometric cross-sectional view of a panel of preferred embodiment of the present invention with a barrier made of alternating stacking insulation elements.

Now referring to FIG. 5, a preferred barrier 20 is illustrated. This preferred barrier is fully described in U.S. patent application Ser. No. 08/682,933, filed Jul. 8, 1996, entitled "INSULATION BARRIER", which is incorporated herein by reference. The unique feature of the thermal insulation barrier of the present invention is that the barrier 20 is made of alternating stacking thermal insulation elements. There are therefore several different, at least two, thermal insulation elements 26 and 28 used to make the thermal insulation barrier 20 of the present invention. For the purpose of this application, "stacking" requires that two adjacent insulation elements each have a corresponding three dimensional design which fit one within the other but which provides a minimal surface contact between the two elements. The term "stacking" is contrasted to "nesting" where products having the same three dimensional design, e.g. DIXIE cups, Dixie being a registered trademark of the James River Corporation, will nest when placed one within the other and have substantial contact between the surfaces of the adjacent cups. Stacking occurs when the elements have corresponding but different designs rather than the same or identical designs and locks movement of adjacent elements in at least one of the directions 90° to the stacking direction. The preferred thermal insulation barrier is made with a pair of thermal insulation elements, one element having a specific three dimensional design and the second element having a corresponding three dimensional design which causes stacking of the two adjacent elements.

An exceptional thermal insulation barrier must address the three types of heat transfer that a barrier encounters; namely, convection, conduction and radiation. Most of the prior art insulation systems address one or two but not all three types of heat transfer which a thermal insulation barrier encounters. Furthermore, when systems use vacuum (low vacuum, $10^{-3}$ torr or higher pressure; high vacuum, $10^{-3}$ torr or lower pressure), the thermal insulation barrier used to separate and maintain separation of the outside skin of the gas barrier material also has to carry the atmospheric pressure load. The thermal insulation barriers of the present invention address all forms of heat transfer and the load requirements of an exceptional insulation barrier.

As with most insulation barriers, the thermal insulation barrier of the present invention is used to fill a space between the hot and cold surfaces and in filling that space reduces the heat transfer by convection of the gases in that space. Heat transfer by convection requires a movement of the fluid (gases) in contact with a surface. One aspect of the present invention is that the size of any gas space within the insulation barrier may be very small reducing the movement of the gases. Convective heat transfer is further minimized by the removal of gases from the space, i.e. by evacuation. Any such vacuum system requires a structure to support the differential pressure between the atmospheric outside pressure and the internal reduced pressure. Solid conductive heat transfer is minimized by extending the length of the heat path through the solid. Radiant heat transfer is minimized by using multiple layers of heat reflective surfaces. It is to be understood that when the space between surfaces is described or is being evacuated, the space referred to may be between fixed surfaces, such as a box within a box structure, or in reference to the space within a panel.

The heat transfer through solids (Q) is proportional to the mean thermal conductivity (measured at two temperatures) of the material ($k_m$), the cross-sectional area (A) through which the heat flows and the temperature difference across the conductor material but is inversely proportional to the length (L) of the conduction path. The thermal insulation elements of the present invention are formed as thin as possible to minimize the cross-sectional area (A) through which the heat flows. The thickness of the barrier element is limited by tensile strength for the tensile element and by resistance to buckling for the compression element. The stacking of the thermal insulation elements to produce the thermal insulation barriers of the present invention is to maximize the length (L) of the thermal path through the barriers and thus minimize the heat transfer. Thus, the ratio of A/L is minimized.

In one embodiment the thermal insulation elements used to make the thermal insulation barrier of the present invention are made of a structural material with a highly emittant surface formed into a geometric shape having a repetitive three dimensional design which permits stacking. In another embodiment of the present invention, the top and bottom elements of the barrier are not uniform in thickness as the other elements used in the barrier and need not have a highly emittant surface. The repetitive three dimensional design of alternatively "stacked" thermal insulation elements is not identical but are complimentary. Two different thermal insulation elements are "complimentary" when the repetitive three dimensional design of the alternate elements cause "stacking", not nesting, and lock movement of adjacent thermal insulation elements in at least one of the directions 90° to the stacking direction.

The complimentary elements are preferably alternately placed in the barrier; however, when more than one thermal insulation element is nested in a barrier, the nested elements are not considered alternate elements in the barrier but are considered equivalent to a single element of the combined thickness of the nested elements. Nested elements may be used at the top and bottom of the thermal insulation barrier to increase strength without the addition of any significant addition of height to the barrier.

Figure 6:
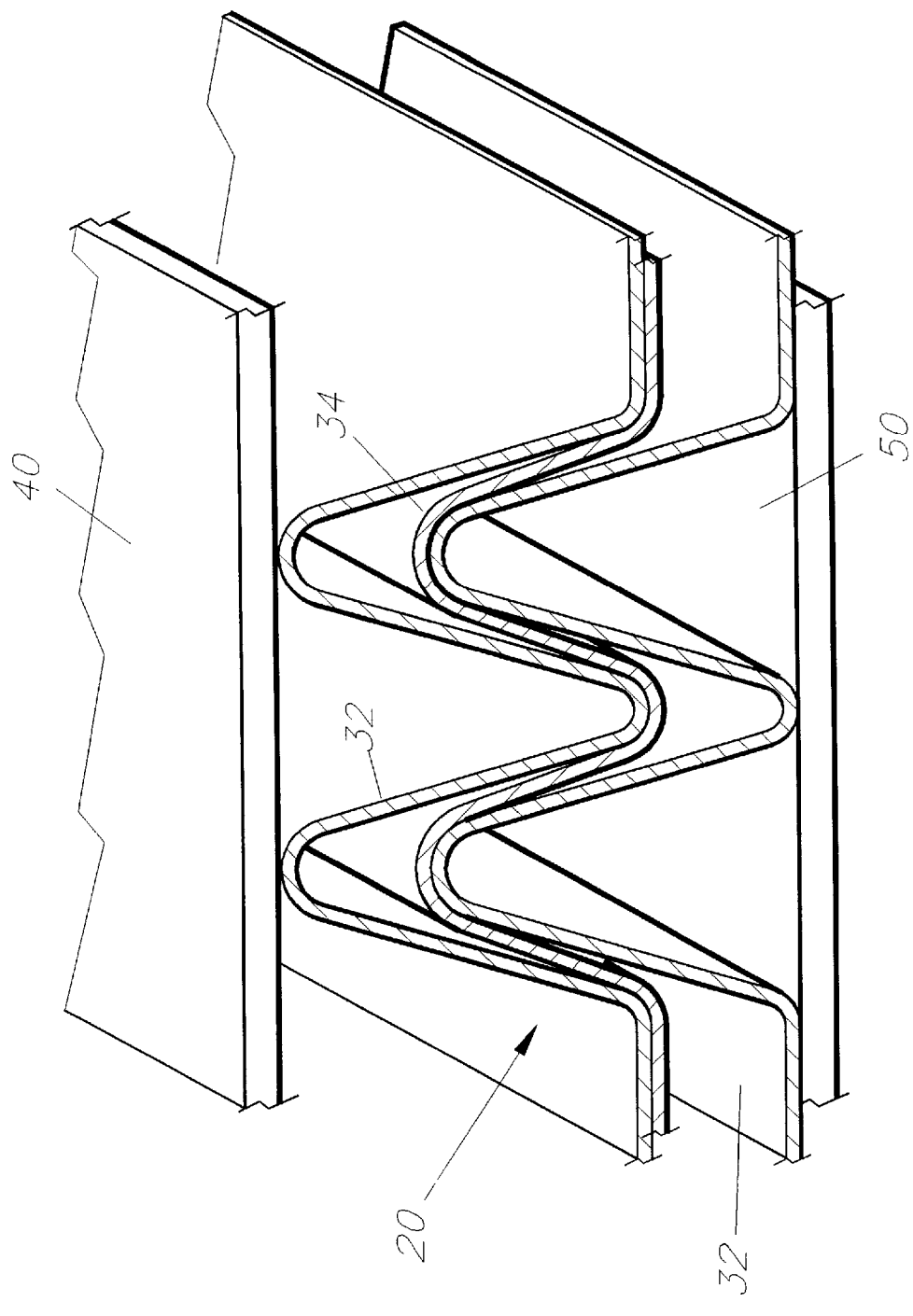
FIG. 6 is an isometric cross-sectional view of thermal insulation elements that have a three dimensional design to form one design of a thermal insulation barrier of the present invention between two surfaces.

Referring to FIG. 6 which shows one design of a thermal insulation barrier 20 of the present invention, a beam design of the thermal insulation elements. In this beam design a cross-section of the repetitive three dimensional design of top and bottom thermal insulation elements 32 is a sine-like wave with a certain base and amplitude; whereas, the cross-section of the adjacent repetitive three dimensional design of thermal insulation element 34 is a sine-like wave with the same base and a smaller amplitude. In this beam design, this difference in the three dimensional design of insulation elements 32 and thermal insulation element 34, are complimentary designs. A complimentary design of the alternate elements causes stacking as shown and further locks the adjacent elements so that they cannot move in the horizontal plane which is 90° to the vertical stacking plane.

Referring to FIG. 7, it is clear that the alternate stacking of the insulation elements places the thermal insulation element 32 in compression and the thermal insulation element 34 in tension.

The thermal insulation elements are made by forming a material such as a thermoplastic, thermoset, ceramic, metal or composite into a geometric shape. Thermoplastics are formed by extrusion, injection molding, blow molding, or pressure-thermal forming; thermosets and ceramics are formed by molding or pressure-thermal forming; metals are formed by stamping or pressure-thermal forming. Many suitable thermoplastics are composites in that they contain other materials such as paper, glass or aggregate in the form of fibers, fine particles or film.

The choice of material used to make the thermal insulation elements of the present invention is primarily related to the thermal and physical properties of the material. No single property of a material will be determinative for making the thermal insulation elements of the present invention. For example, the thermal conductivity of a metal such as aluminum is high and therefore as the sole material for a thermal insulation element is not as suitable for making a thermal insulation element as other materials, i.e. thermoplastics; however, aluminum has a highly emittant surface. A composite composed of a thin film of aluminum as a emittant surface on a thermoplastic, on the other hand, is a material where the thermal conductivity of the composite of the metal and thermoplastic is only slightly greater than that of the thermoplastic, which is very low. As will be explained in more detail hereinafter, composites, especially those materials having a highly emittant surface layered on another material, are preferred as the material of the thermal insulation elements of the present invention.

Referring now to FIG. 8, the heat path is extended or maximized since the heat path is through the outer surface 40 to first thermal insulation element 32 and then to thermal insulation element 34 only through points of contact between elements. Likewise, the heat path is further extended between the thermal insulation element 34 and the second thermal insulation element 32, as shown by the arrows in FIG. 8. The thermal conduction path L of the thermal insulation barriers of the present invention is many times greater than barriers of the prior art and typically can exceed at least two (2) to five (5) times the distance between the hot and cold surfaces 40 and 50 respectively.

The conduction of heat through the gas present in the spaces of an insulation barrier is also addressed in the thermal insulation barriers of the present invention. It is preferred that the thermal insulation barriers of the present invention are placed into a space which is evacuated. When evacuated, the removal of the gases (air or primarily, nitrogen and oxygen) in the spaces of the barrier minimizes conductive heat transfer across the barrier. Furthermore, the thermal insulation barrier of the present invention provides multiple layers (barriers) to minimize movement of the gases to transfer conductive heat across the barrier space. When the barrier space is evacuated, the thermal insulation barrier 20 supports the surfaces 40 and 50 (surfaces 40 and 50 may be the skins 12 and 14, respectively of a panel). The thermal insulation barrier 20 of the present invention must be able to carry the high compressive loads of an evacuated structure to balance the atmospheric pressure load. This parameter of load will affect the geometry selection of the thermal insulation barriers of the present invention (this parameter and the effect on geometry will be described in more detail hereinafter). The evacuation of the space in which the thermal insulation barriers are placed may be at a low vacuum or a high vacuum.

As important as the selection of the material for the thermal insulation elements to obtain minimum mean thermal conductivity of the material ($k_m$) and to stack the elements according to the present invention to minimize the ratio of A/L, it is preferred that the surface of the formed thermal insulation element be a highly emittant surface. This characteristic of the thermal insulation barriers of the present invention addresses the radiation component of heat transfer. Since the heat transfer by radiation is directly proportional to the emissivity and emissivity is the reciprocal of emittance, the higher the heat emittance of the surface the lower the heat transfer. The preferred thermal insulation barriers of the present invention have multiple layers of elements with at least one surface of continuous heat reflective material to greatly reduce radiative heat transfer. The preferred thermal insulation elements of the present invention are made of a material with a surface to provide the desired high heat reflection or emission. Therefore, the preferred materials for making the thermal insulation elements are composites, meaning either a layered composite with an outer layer of material that has a highly emittant surface or a material that is coated or treated before or after the elements are formed into a geometric shape, for example the shape of a beam. A schematic representation of a radiant heat path 33 between the highly emittant surfaces of the thermal insulation elements of the present invention is shown in FIG. 9.

The cumulative parameters as chosen above can produce a thermal insulation barrier of the present invention which has an R value (the standard rating of insulation), excluding any edge effect, of three to ten times higher than the best known insulation systems. It is clear therefore that the thermal insulation barriers of the present invention address all four parameters of an exceptional insulation barrier and are better than any known prior art thermal barrier.

Another feature of the present invention is that the preferred thermal insulation barrier is multi-layer. A multi-layer thermal insulation barrier 20 is formed with any number of thermal insulation elements. In a preferred barrier 20, referring to FIG. 10, there are an odd number of elements with top and bottom thermal insulation elements 32, which contact surfaces 40 and 50 respectively, in compression and alternate thermal insulation elements 34 in tension. There is no limit to the number of alternately stacked thermal insulation elements that may be used to form a multi-layer thermal insulation barrier 20. It is clear that the significance of the number of thermal insulation elements used in stacking is to minimize the A/L ratio by lengthening L and to minimize radiation heat transfer. Additionally, heat transfer is minimized by the small areas of contact that exists at the surfaces of mating thermal insulation elements. The greater the number of thermal insulation elements in the direction through the thermal insulation barrier or in the direction between the surfaces (one hot and one cold), the greater the thermal resistance of the thermal insulation barrier.

Figure 11:
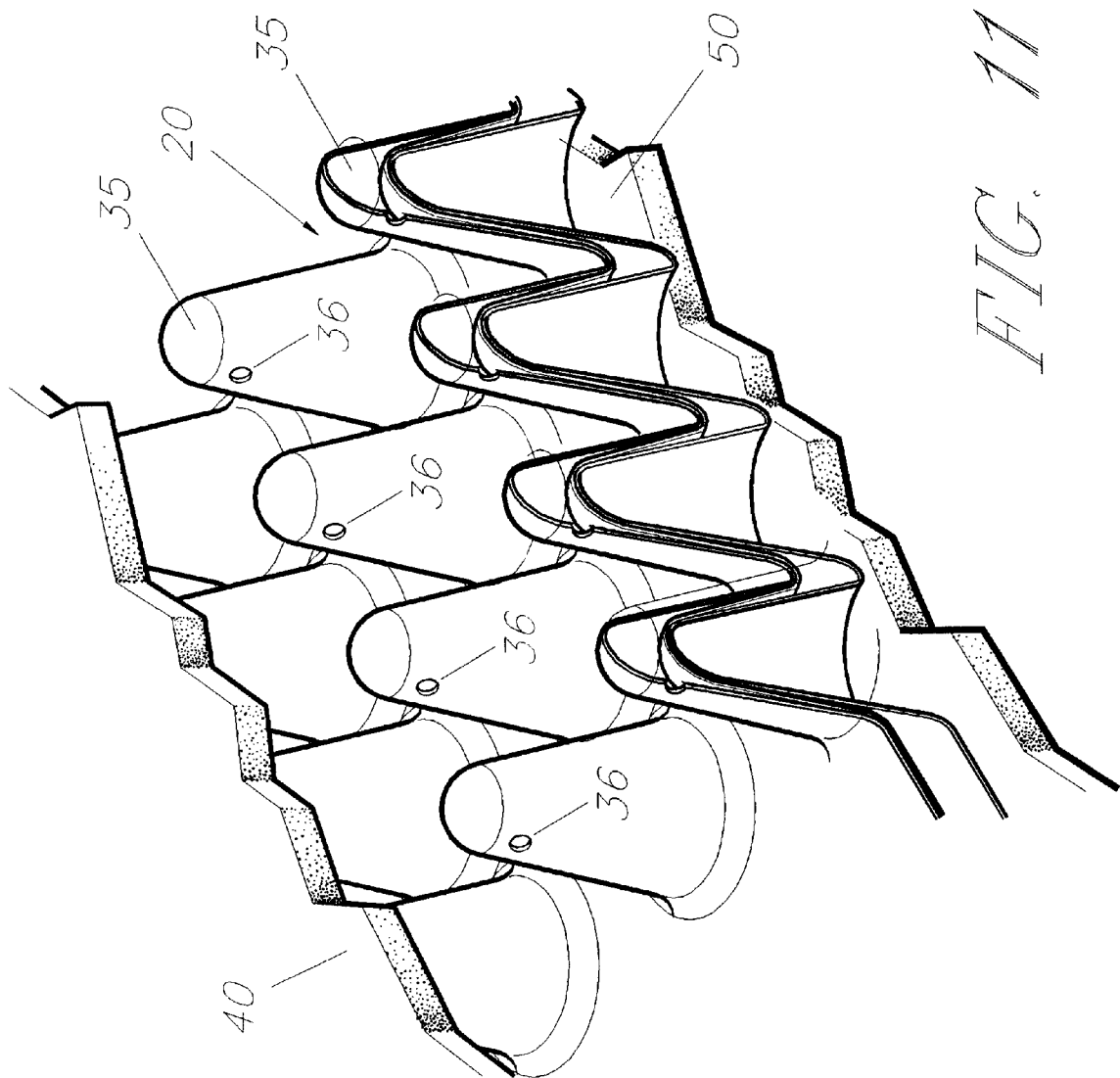
FIG. 11 is an isometric cross-sectional view of another design of a thermal insulation barrier of the present invention between two surfaces.

The geometric shape of the stacked thermal insulation elements is not limited to a beam formed by a sine-like wave design. As illustrated in FIG. 11, the geometric shape may be a cone or cone-like; thus, a thermal insulation barrier 20 having a repetitive three dimensional design of cones 35 is placed between two surfaces 40 and 50. To provide a thermal insulation element of the present invention with a repetitive three dimensional design, the geometric shape need not be regular across the total dimension of the element. In other words, the thermal insulation element formed using a design of a sine-like wave may have a beam-like three dimensional design for a number of repetitions, for example two to four, then extend in a flat portion with no three dimensional beam-like design repeated. An alternate three dimensional design is one where the space between beam-like or cone-like designs is extended with varying lengths of flat portions. The thermal insulation elements may be formed into still further geometric shapes or combination of shapes (i.e. combination of beams and cones), may include stiffeners, and may be textured to improve structural and thermal barrier characteristics. The considerations to these alternates is the ease of manufacture and the thickness of the elements required to support the ultimate load that the thermal insulation barrier 20 must bear. A feature of the cone-like design is that the stacking of the thermal insulation elements locks movement in both directions 90° to the stacking direction.

When a vacuum is drawn on certain designs of the thermal insulation barrier, the compressive thermal insulation elements 32 may have openings 36 (see FIG. 11) to permit the removal of gases trapped in the spaces formed by the stacked thermal insulation elements. These openings 36 are random and may be located so that they have the least effect on the structural properties of the elements. In some stacking configurations where the spaces are relatively closed, the openings may be in both the compression and tension elements. The openings 36 are positioned to open a tight or limited space on one side of the element to a larger space to remove the gases and not allow entrapment when the thermal insulation barrier is evacuated.

Some illustrations of the preferred thermal insulation barriers 20 of the present invention are shown between surfaces 40 and 50 without any description of what those surfaces are. The reason is that those surfaces may be part of a structure independent of the panels 1 or thermal insulation barriers such as the box within a box or refrigerator where the surfaces are the outer and inner boxes of that kind of structure. It is to be understood that when the space between surfaces is described as being evacuated that it applies to both panels and non-panels. The space, either a panel or a box in a box structure, can be evacuated. In certain instances the air removed is replaced with a gas having a thermal conductivity much lower than air, such as argon, krypton, radon or xenon at a pressure which may be below ambient pressure. Likewise, panels in which the surfaces are an envelope to the thermal insulation barrier are preferably evacuated.

When the space is evacuated in which the thermal insulation barriers reside, several approaches may be taken to overcome the point loading on the external thermal insulation element in contact with the outside surface or the skin of the panel. Reference is made to FIG. 10 wherein the compression thermal insulation elements 32 are shown in point contact with the surface 40. One approach is to have load spreaders 37, either a solid or compressible structure, of a female design which will double the thickness at the points of contact of the thermal insulation barrier 20 with the surface 40. Another approach is to use opposing and offset compression thermal insulation elements with a complimentary tension thermal insulation element between the two compression thermal insulation elements.

Figure 12:
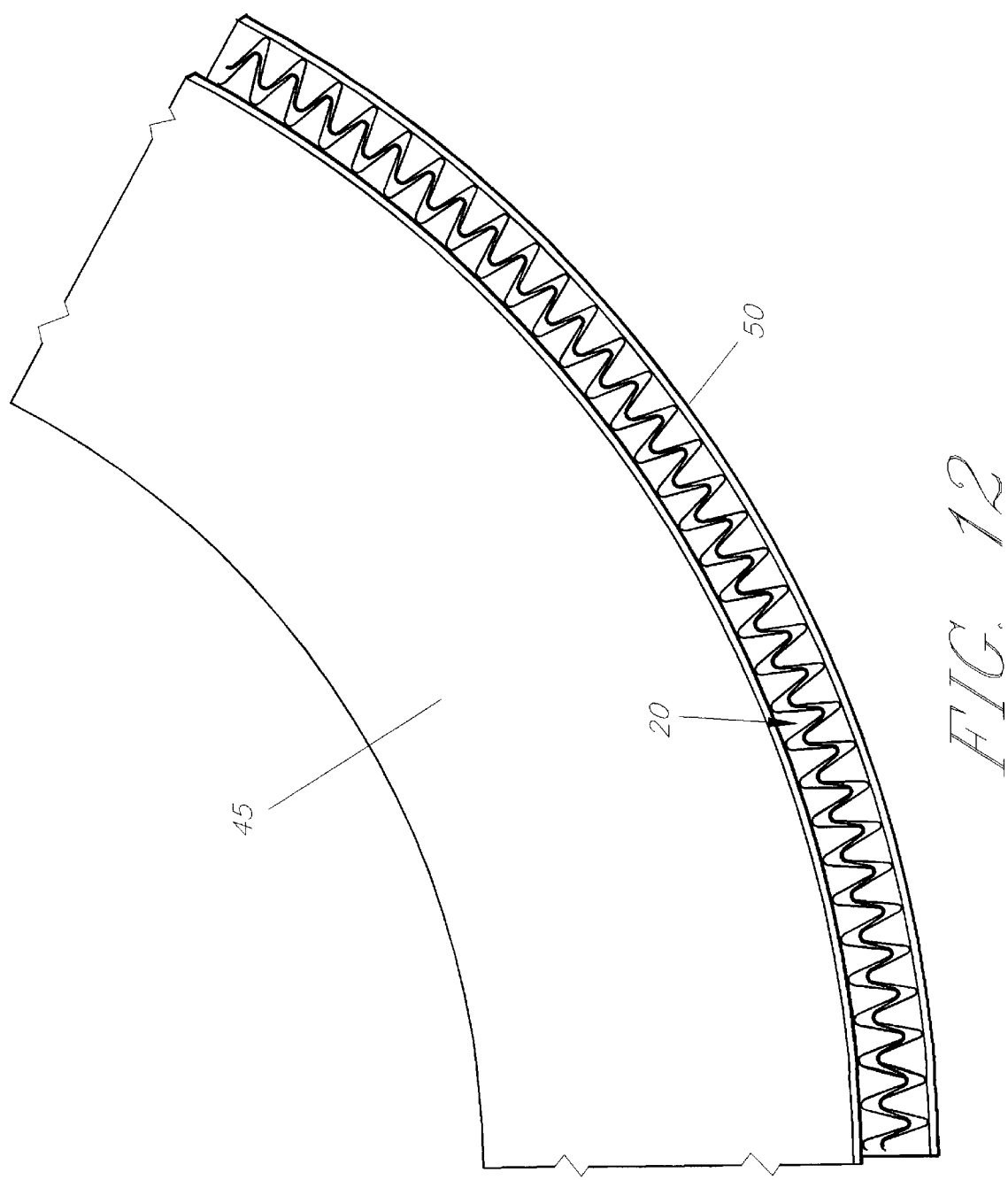
FIG. 12 is an isometric cross-sectional view of one design of a thermal insulation barrier showing the barrier placed between curved surfaces.

The choice of repetitive three dimensional design has a bearing on the structural characteristics of the thermal insulation barrier 20. One consideration in the choice of a three dimensional design is that the design accommodate the load on the barrier 20, such as when the space between the surfaces 40 and 50 is evacuated. Another consideration in the choice of a three dimensional design is whether the barrier can be bent. A thermal insulation barrier 20 having the beam-like design is capable of bending as shown in FIG. 12. This thermal insulation barrier 20 may be used to insulate a curved surface 45 such as a tank or a pipe. The outside surface 50 may be a material which is easily bendable into a curved surface to hold the thermal insulation barrier 20 in place.

Figure 13:
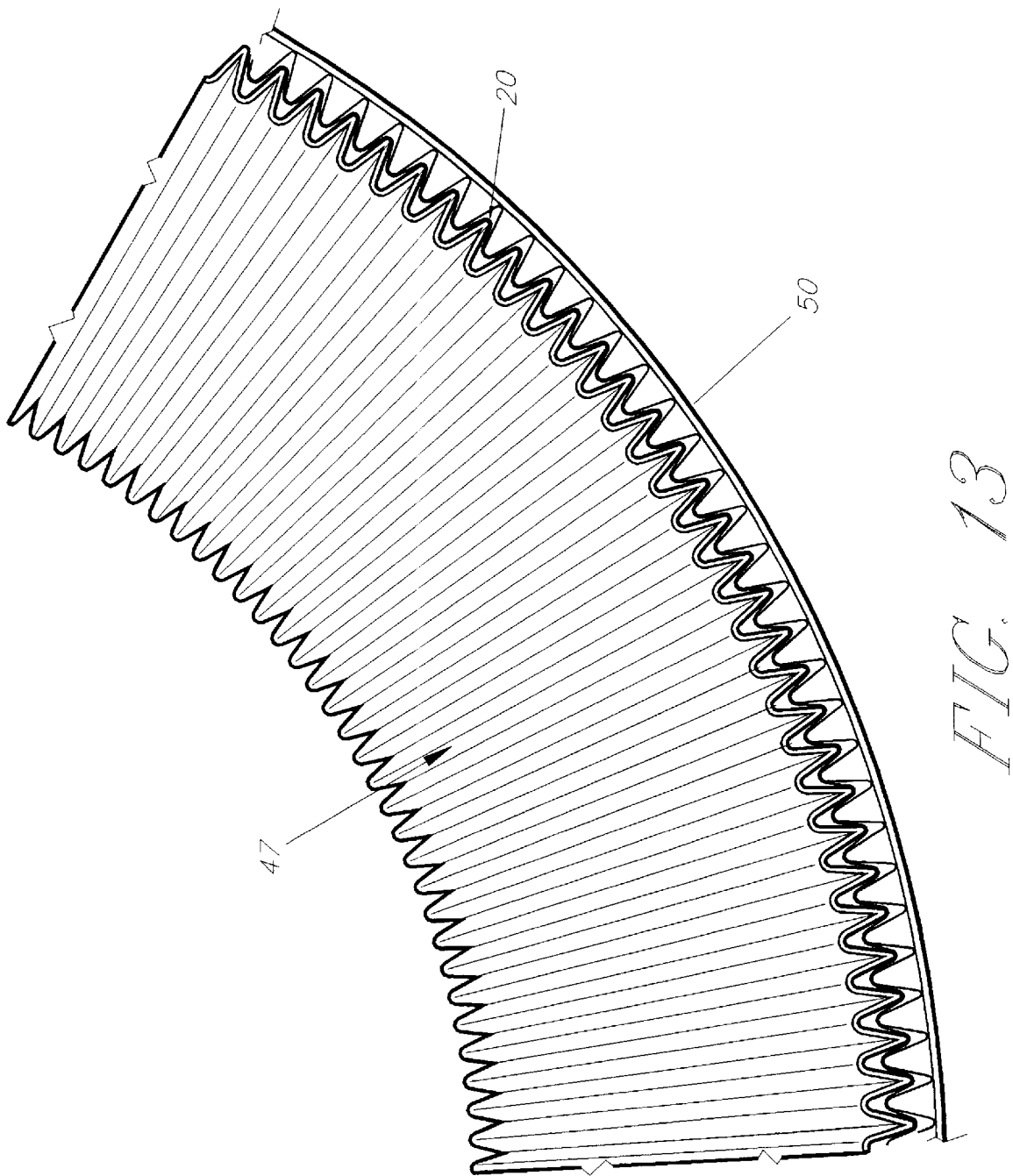
FIG. 13 is an isometric cross-sectional view of another design of a thermal insulation barrier of the present invention.

An alternate design for a curved surface is shown in FIG. 13. In this embodiment the outer surface 47 has the same three dimensional design as the top or outside thermal insulation element which is part of and forms the thermal insulation barrier 20. The design of the surface 47 in FIG. 13 is illustrated as the same beam-like design as a compression element; however, the design may be the same as a tension element. The only difference in surface 47 and the thermal insulation element of the thermal insulation barrier 20 is that the choice of material may be different and the thickness of the surface 47 may be greater than that of the corresponding element.

Figure 14:
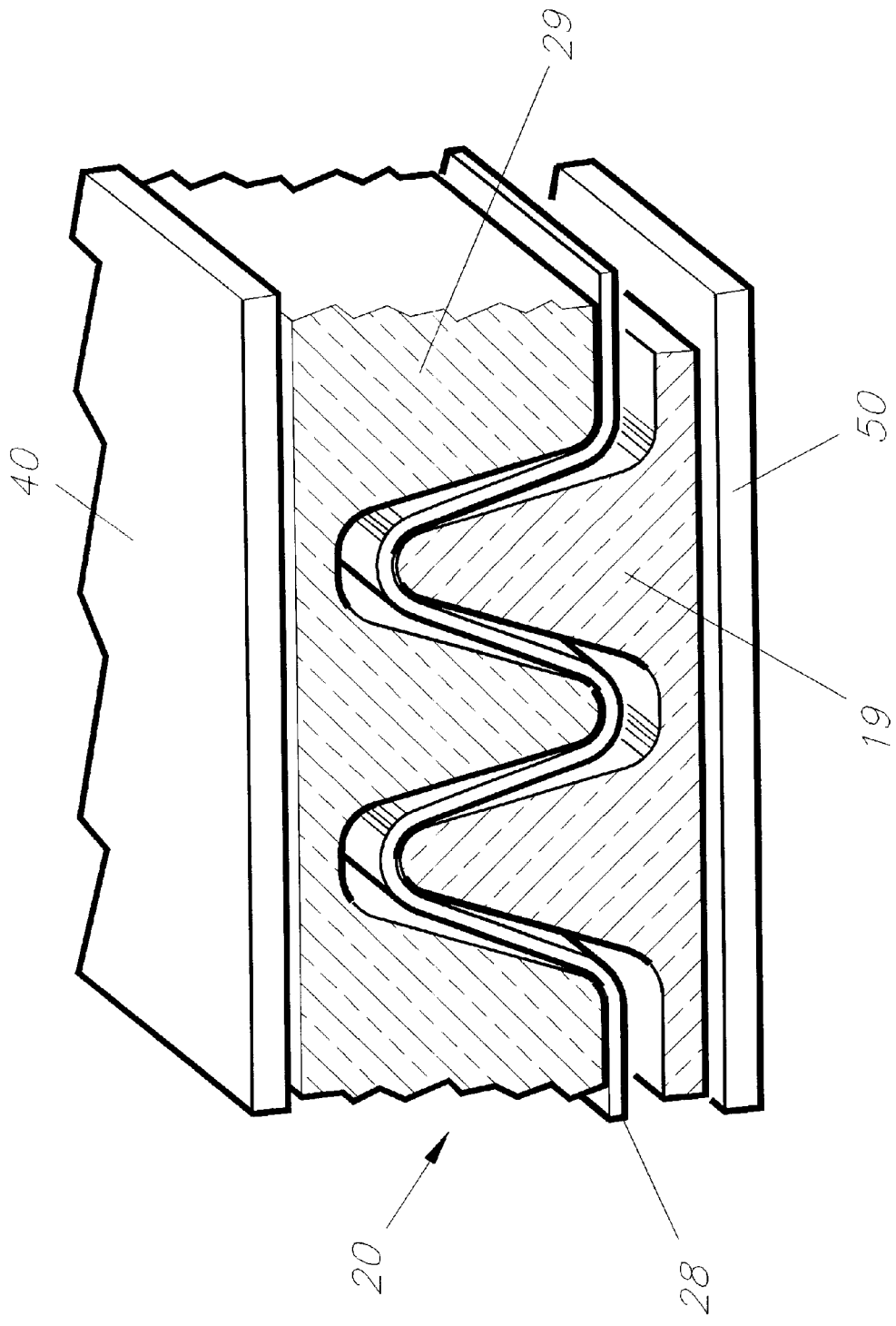
FIG. 14 is an isometric cross-sectional view of a panel of another embodiment of the present invention with a barrier using thermal insulation elements that have a three dimensional design on only one surface and an alternating stacking insulation element.
Figure 15:
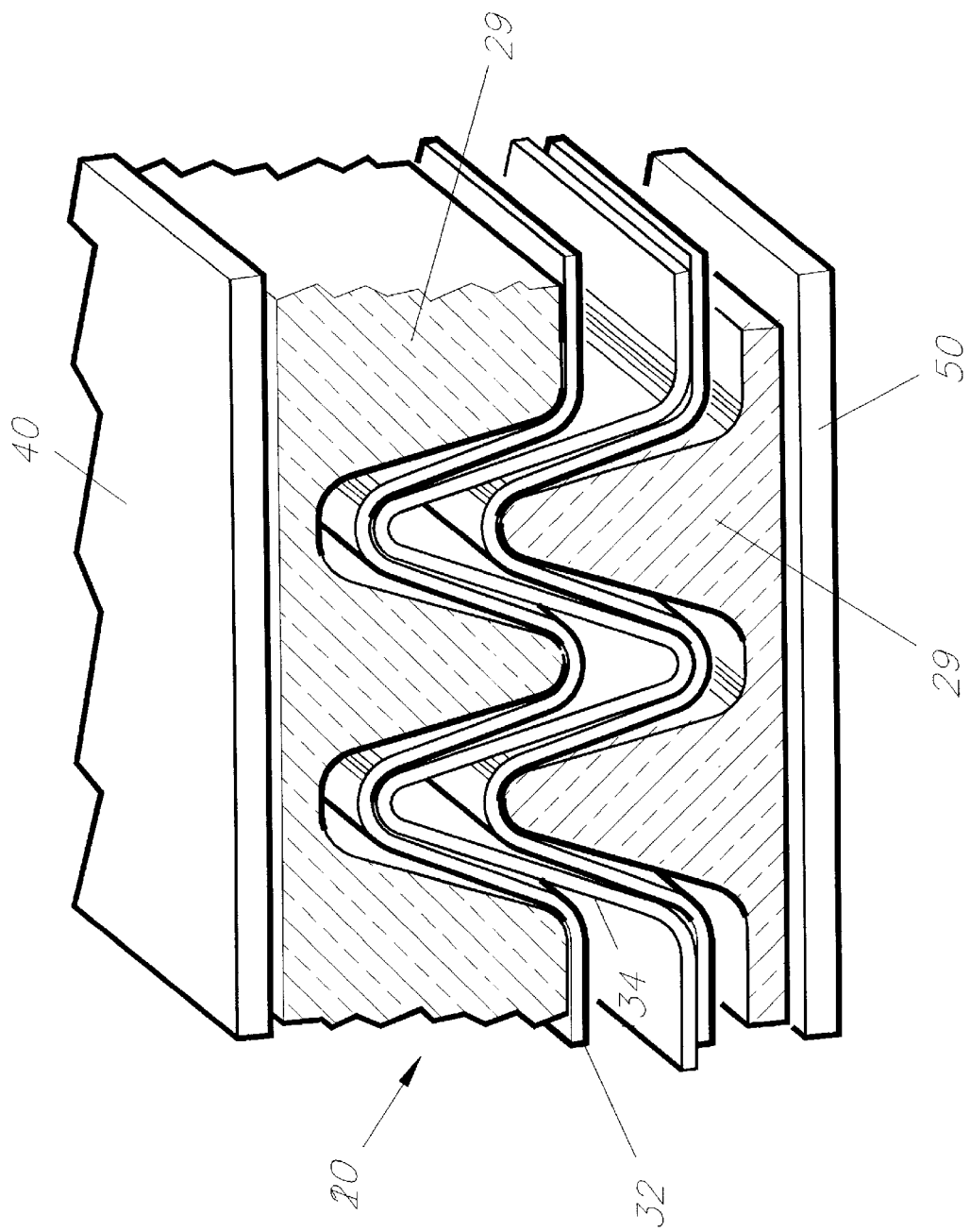
FIG. 15 is an isometric cross-sectional view of a barrier using thermal insulation elements that have a three dimensional design on only one surface and multiple alternating stacking insulation elements.

In the FIG. 14 embodiment of the present invention, the top and bottom elements of the barrier 20 are not uniform in thickness as the other elements used in the barrier and need not have a highly emittant surface. In this embodiment of the barrier 20, an element 29 is used which has the three dimensional design on only one surface, the element not being a thin sheet material but having a substantial cross-sectional area. The thermal insulation elements 29 are made of a solid, formable, open structured material, such that entrapped gasses may be evacuated, such as open celled polyurethane from ICI, open celled ceramic foams, xerogels, glass/ceramic fiber composites such as Fiberfrax Duraboard 2600, a product of the Carborundum Company, compacted powders such as silica with appropriate binders and formed stainless steel wire mesh. These solid, open structured materials may be formed as a long block which then is cut to form the three dimensional design on one surface or are molded to form the desired three dimensional design. The design may have the same design as a compression element or a tension element to be used in making the barrier 10 of the present invention.

An improved barrier 20 will have a greater number of alternatively "stacked" complimentary thermal insulation elements, a barrier with seven elements having R values which exceed 40. The repetitive three dimensional design of alternatively "stacked" thermal insulation elements is not identical but are complimentary. Two different thermal insulation elements are "complimentary", for the purposes herein, when the repetitive three dimensional design of the alternate elements cause "stacking", not nesting, and lock movement of adjacent thermal insulation elements in at least one of the directions 90° to the stacking direction.

The complimentary elements are preferably alternately placed in the barrier; however, when more than one thermal insulation element is nested in a barrier, the nested elements are not considered alternate elements in the barrier but are considered equivalent to a single element of the combined thickness of the nested elements. Nested elements may be used at the top and bottom of the thermal insulation barrier to increase strength without the addition of any significant addition of height to the barrier.

Figure 16:
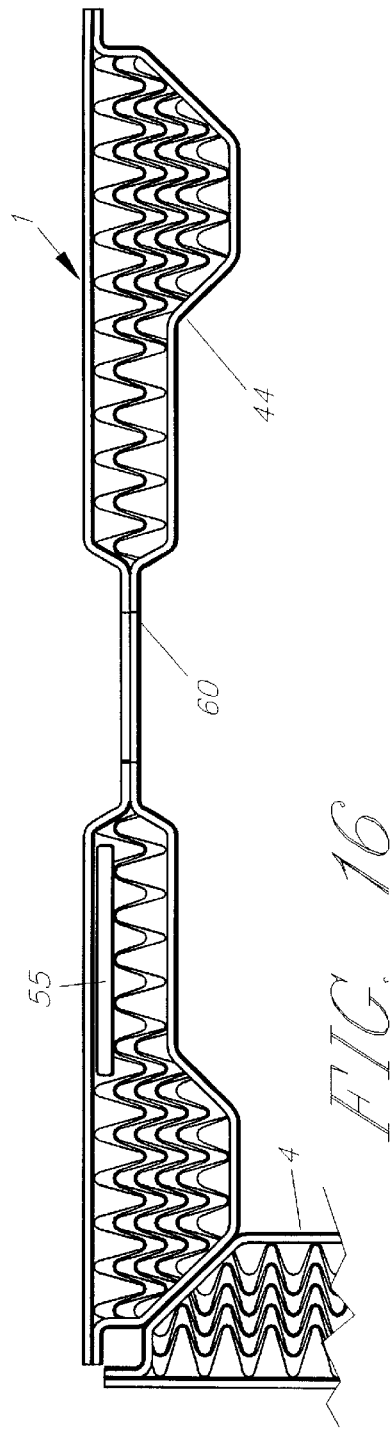
FIGS. 16, 17 and 18 are cross-sectional views of a panel with various designs of openings in the panel and each panel has getter material in the panel.
Figure 17:
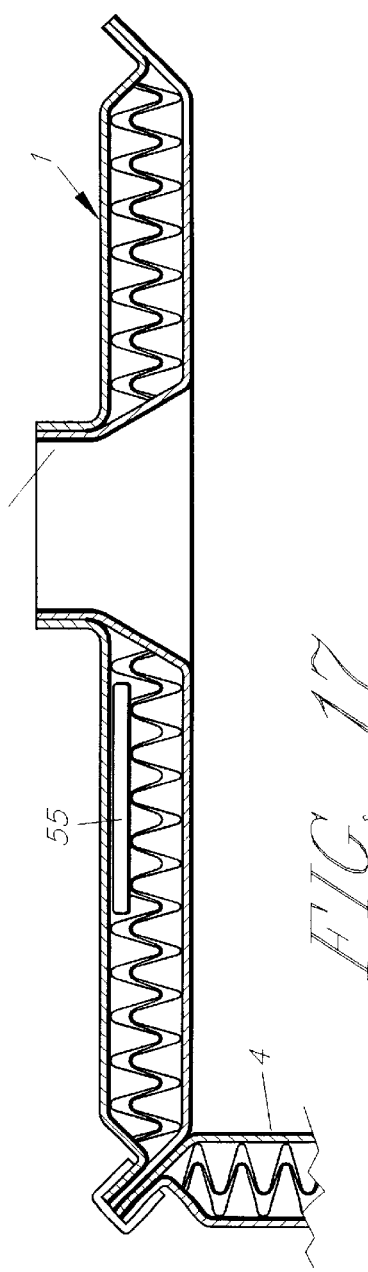
Figure 18:
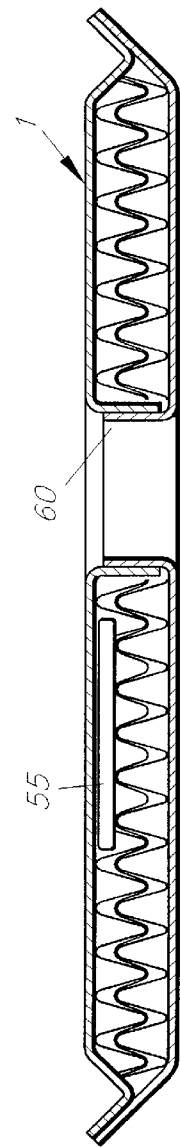

Referring now to FIGS. 16, 17 and 18, a panel 1 having an opening 60 is shown. The ability to make panels which provide exceptional thermal barriers with opening recognizes that most surfaces requiring insulation also have piping or electrical access openings or other irregularities in the surface. The configuration of the opening 60 is different in the three Figures. It is recognized that these openings or irregularities must deal with the piping or whatever is passing through these openings as a separate insulation problem. These Figures also illustrate that one panel may be connected to a second panel 4. While the connection is shown at right angle to the first panel, it is understood that the connection may be from 0° to 180°.

FIGS. 16, 17 and 18 also illustrate a panel having a thermal insulation barrier 20 which supports a getter material 55. The desired materials for forming the panel 1 have low permeability to these gases; however, when the panel is evacuated and has a life in years, it is desirable to use a getter material to trap any gases to maintain the vacuum in the panel. The preferred approach is to substantially eliminate the permeability of gases through the skins of the panels by the choice of material making panel 1 and using a getter material which gets the nitrogen, oxygen and other gases which over long periods time may permeate the surfaces 12 and/or 14 (or skins) of the panel 1 or may offgas from the materials within the panel.

The uniqueness of the thermal insulation panels of the present invention are illustrated in the following examples:

EXAMPLE 1

This example illustrates a panel of the present invention having the inner or outer skin, or both, formed from a laminated film having a metal coated polymer layer such as aluminized polyester to produce a panel:

A high gas barrier thin skin is made of the following laminated layers:

a heat sealable layer of metallocene polyethylene, a first barrier film of biaxially oriented polypropylene (BOPP) 0.001 inch thick and aluminized 250 angstroms thick and coated with an adhesive, a second barrier film of BOPP of the same thickness, aluminized and coated with an adhesive, and a high density polyethylene (HDPE) film 0.003 inch thick for structure and puncture resistance.

This laminant is used as both the upper and lower portion of the skin of the panel which has a barrier formed as follows:

A fiber glass mat 1 inch thick having a cell size greater than 0.5 microns.

The laminant, which is cut larger than the dimensions of the barrier, is heat sealed on three sides of the barrier. The panel is then introduced into a vacuum chamber to evacuate the panel. While in the chamber, the fourth side of the panel is heat sealed to complete the vacuum panel of the present invention. Also while in the chamber, getter material may be introduced into the panel.

This panel may have the heat sealed edges at any position along the heat sealed edge due to the flexibility of the skins.

EXAMPLE 2

This example illustrates a panel of the present invention having the inner or outer skin, or both, formed from a laminated film having a non-metal coated polymer, such as $SiO_x$ coated polyester, to produce a panel:

A high gas barrier thin skin is made of the following laminated layers:

a heat sealable layer of polyethylene, a first barrier film of biaxially oriented polypropylene (BOPP) 0.001 inch thick with a $SiO_x$ coated surface 250 angstroms thick and coated with an adhesive, a second barrier film of BOPP of the same thickness, $SiO_x$ coated surface 250 angstroms thick and coated with an adhesive, and a high density polyethylene (HDPE) film 0.003 inch thick for structure and puncture resistance.

This laminant is used as both the upper and lower portion of the skin of the panel which has a barrier formed as follows:

Each of five layers is made from syndiotactic polystyrene, a product of Dow Chemical Company:

a flat sheet, a formed compression element (a conical structure of FIG. 11), a formed tension element (a complementary element), a formed compression element (same as 2 above), and a flat sheet.

This barrier has a cell size on the order of 0.25 cm or more. The panel is made as in Example 1 above.

EXAMPLE 3

This example illustrates the thermal insulation barriers in a panel of the present invention wherein the thermal insulation elements in the barrier uses two different materials to produce a panel of light weight (e.g. 0.5 lbs/ft$^2$) construction:

The panel is substantially thinner than one inch (e.g. 0.375 inch) thick.

The panel skins are made from a liquid crystal polymer, VECTRA A-950 made by Hoechst Celanese under the trade name VECTRA which is a high permeation barrier thermoplastic. The panel is made where both surfaces are made with VECTRA; however, one skin may alternatively be a metal such as 300 series stainless steel or aluminum. At least one piece of the thermoplastic is thermoformed into a panel with a flat lip as shown in FIG. 5.

The thermal insulation barrier is made with a minimum of elements; if three elements are used, two compression and one tension then a R value of approximately 75 Ft$^2$-hr-F/Btu-in is obtained; if five elements are used, three compression and two tension then a R value of approximately 100 Ft$^2$-hr-F/Btu-in is obtained.

The thermal insulation elements are extruded from two different materials, amorphous polyetherimide (PEI), a product of GE under the GE trade name Ultem 1000 and polyethylene terephthalate copolyesters (PETG). The compressive thermal insulation elements are made with the PEI. The tension thermal insulation elements are made with the PETG. The PEI and PETG is extruded into film and rolled in widths of 48 inches or more. The film is then aluminized by entrance (either in bulk or fed through the walls) into a vacuum system via evaporative techniques. Each film may be coated on one or both sides.

The aluminized film is then thermoformed via a thermomechanical method wherein the film is heated and run through rotary and complimentary cylinders (with the appearance of meshing gears) to produce the sine-like beam structure as depicted in FIG. 10. The cylinders used to produce the geometric shape having a repetitive three dimensional design for the PEI sheet is not the same but complimentary to that for the PETG. The thermoformed sheets are then cut and trimmed to the size and shape of the desired thermal insulation barrier to be made. The PEI and PETG thermal insulation elements are then stacked to form the desired thermal insulation barrier.

The panel skins and the thermal insulation elements are then assembled in a vacuum chamber which eliminates the need for subsequent evacuation. The flat lip of the thermoformed panel skin provides a surface for bonding the other skin using a thixotropic paste adhesive such as HYSOL EA 934 NA, a product of The Dexter Corp., or welding using friction welding techniques such as ultrasonic, or electroless plated with a copper/nickel system and subsequently soldered together.

A replaceable getter material is introduced to the evacuated region of the panel to maintain the vacuum over a significant time span.

EXAMPLE 4

This example illustrates a panel of the present invention having the upper or lower skin, or both, formed to have the same design as one of the thermal insulation elements of the thermal insulation barrier in the panel. A semi-flexible panel: The procedure of Example 3 is followed, the compressive thermal insulation elements, the tension thermal insulation elements and panel skins are all made of liquid crystal polymer, Vectra A-950 made by Hoechst Celanese, except that at least one skin is formed to produce the sine-like beam structure as depicted in FIG. 13. The panel skin is thicker than the thermal insulation elements and is cut so as to be longer than the thermal insulation elements of the thermal insulation barrier. If used in the configuration of FIG. 13, the skin may replace the outermost compressive thermal insulation element of the thermal insulation barrier, i.e. the first element of the thermal insulation barrier is a tension element. The use of an outer skin thus has the accordion-like surface that can be compressed or stretched without incurring high stresses on the skin. Alternatively, the panel skin which is formed to conform to the design of the thermal insulation barrier may be on one or both sides and may be formed as the compression or tension member.

These panels are formed for application around cylinders or formed with a curved geometry suitable for spheres.

It is understood that other combinations or the combination of the structures illustrated are within the spirit of the invention as set forth in the following claims.

I claim:

1. An insulation panel which comprises:
    an envelope made of a multi-layer thin skin that provides a high gas barrier material having an oxygen transmission rate of $1\times10^{-4}$ cc (STP)/100 in$^2$/day or less and a thermal conductivity product of less than $1\times10^{-4}$ Wm/mK; and
    a thermal insulation barrier which includes a macro-structural support structure having a cell size of 0.5 micron or greater which supports said envelope,
    said envelope surrounding said barrier and has sealed edges.

2. An insulation panel according to claim 1 wherein said sealed edge is sealed with an adhesive.

3. An insulation panel according to claim 1 wherein said sealed edge is sealed by thermal welding.

4. An insulation panel according to claim 1 wherein said sealed edge is sealed by metallic plating and soldering.

5. An insulation panel according to claim 1 wherein said panel is evacuated and contains getter material.

6. An insulation panel according to claim 1 wherein said envelope is made of at least two pieces, an upper portion and a lower portion, and said upper portion and said lower portion of said envelope are a thin skin of liquid crystal polymer.

7. An insulation panel according to claim 1 wherein said skin of high gas barrier material is a laminant selected from the group consisting of multiple layers of metal coated polymers, multiple layers of non-metal coated polymers, and multiple layers of high gas barrier polymers.

8. An insulation panel which comprises:
    an envelope made of at least two pieces, an upper portion and a lower portion, of a high gas barrier material, at least one of which is selected from the group consisting of liquid crystal polymers, a laminated film having an aluminum layer and a laminated film having a $SiO_2$ layer; and
    a thermal insulation barrier which supports said skin, said skin surrounding said barrier and is evacuated; and said barrier comprising
        at least three alternately stacked thermal insulation elements, each said element formed of a structural material with a highly emittant surface having a geometric shape of a repetitive three dimensional design which permits stacking of said element with another thermal insulation element and which locks movement of adjacent insulation elements in at least one of the directions 90° to the stacking direction;
        two of said insulation elements having the same design, said alternate element insulation element having a different and complementary design, whereby when said three elements are alternately stacked, any point of contact between insulation elements is a contact between said alternate insulation element and only one of said other insulation elements.

9. An insulation panel according to claim 8 wherein said envelope of thin skin high gas barrier material is made of the same material for the upper portion of said envelope and the lower portion of said envelope.

10. An insulation panel according to claim 8 wherein said envelope of thin skin high gas barrier material is made of different material for the upper portion of said envelope and the lower portion of said envelope.

11. An insulation panel according to claim 8 wherein said thermal insulation barrier which supports said skin has insulation elements made of a material selected from the group consisting of thermoplastics, thermosetting polymers, ceramics, metals and composites.

12. An insulation panel which comprises:
    an envelope made of two pieces, an upper portion and a lower portion, of thin skin high gas barrier material; and
    a thermal insulation barrier which supports said skin, said skin surrounding said barrier; and said barrier comprising
        at least two different stacked thermal insulation elements, each of said elements formed of a structural material having a geometric shape which is different and complimentary to said other element to permit stacking of said elements, whereby over the geometric shape, free space and minimal contact is provided between elements, and which locks movement of said elements in at least one of the directions 90° to the stacking direction.

13. An insulation panel according to claim 12 wherein there is only one location of contact between said different insulation elements.

14. An insulation panel which comprises:
   an envelope made of at least two pieces, an upper portion and a lower portion, of a high gas barrier material, at least one of which is a thin skin of liquid crystal polymer;
   a thermal insulation barrier which supports said envelope, said envelope surrounding said barrier and has sealed edges; and
   a getter material within said envelope.

15. An insulation panel according to claim 14 wherein said sealed edge is sealed with an adhesive.

16. An insulation panel according to claim 14 wherein said sealed edge is sealed by thermal welding.

17. An insulation panel according to claim 14 wherein said sealed edge is sealed by metallic plating and soldering.

18. An insulation panel according to claim 14 wherein said sealed edge is sealed with an adhesive, the adhesive thickness controlled by a ridge around the perimeter of said panel sealed edge.

19. An insulation panel according to claim 14 wherein said upper portion of said envelope and the lower portion of said envelope are a thin skin of liquid crystal polymer.

20. An insulation panel which comprises:
   an envelope made of at least two pieces, an upper portion and a lower portion, of a high gas barrier material, at least one of which is a thin skin of liquid crystal polymer; and
   a thermal insulation barrier which supports said skin, said skin surrounding said barrier and is evacuated; and said barrier comprising
      at least three alternately stacked thermal insulation elements, each said element formed of a structural material with a highly emittant surface having a geometric shape of a repetitive three dimensional design which permits stacking of said element with another thermal insulation element and which locks movement of adjacent insulation elements in at least one of the directions 90° to the stacking direction;
      two of said insulation elements having the same design, said alternate element insulation element having a different and complementary design, whereby when said three elements are alternately stacked, any point of contact between insulation elements is a contact between said alternate insulation element and only one of said other insulation elements.

21. An insulation panel according to claim 20 wherein said envelope of thin skin high gas barrier material is made of the same material for the upper portion of said envelope and the lower portion of said envelope.

22. An insulation panel according to claim 20 wherein said envelope of thin skin high gas barrier material is made of different material for the upper portion of said envelope and the lower portion of said envelope.

23. An insulation panel according to claim 20 wherein said thermal insulation barrier which supports said skin has insulation elements made of a material selected from the group consisting of thermoplastics, thermosets, ceramics, metals and composites.

24. An insulation panel according to claim 20 wherein said thermal insulation barrier which supports said skin is made of a multi-layer thermal insulation barrier with a beam design.

25. An insulation panel according to claim 20 wherein said thermal insulation barrier which supports said skin is made of a multi-layer thermal insulation barrier with a cone design.

* * * * *